United States Patent [19]

Oshima et al.

[11] 3,789,376

[45] Jan. 29, 1974

[54] MATRIX MEMORY DEVICE OF HIGH BIT DENSITY

[75] Inventors: Shintaro Oshima; Toshihiko Kobayashi, both of Tokyo; Tetsusaburo Kamibayashi, Niza; Akira Okada; Yoshihisa Komazawa, both of Tokyo; Keigo Komuro, Kanagawa-ken, all of Japan

[73] Assignee: Kokusai Denshin Denva Kabushiki Kaisha, Tokyo-to, Japan

[22] Filed: Nov. 27, 1972

[21] Appl. No.: 309,679

Related U.S. Application Data

[63] Continuation-in-part of Ser. No. 12,393, Feb. 18, 1970, abandoned.

[52] U.S. Cl. ...... 340/174 PW, 340/174 AG, 174 BC, 340/174 BC, 340/174 M, 340/174 TF

[51] Int. Cl. ........................ G11c 11/14, G11c 11/04

[58] Field of Search. 340/174 AG, 174 PW, 174 BC

[56] References Cited

UNITED STATES PATENTS 3,699,619 10/1972 Yasuda et al. ............... 340/174 PW

*Primary Examiner*—James W. Moffitt

*Attorney, Agent, or Firm*—Robert E. Burns; Emmanuel J. Lobato

[57] ABSTRACT

A matrix memory device comprising a set of parallel row magnetic lines arranged equally spaced and two sets of parallel column conductive lines arranged equally spaced so as to intersect orthogonally with the row magnetic lines so that one and the other of the two sets of parallel column conductive lines hold insulatively the set of parallel row magnetic lines therebetween to provide memory cells at intersections between the row magnetic lines and the column conductive lines, where at least one set of the two sets of parallel column conductive lines comprises parallel ribbon conductors each having a height more than twice a width thereof and coated with a ferromagnetic thin film except an edge line directed to the row magnetic lines and fixed in an insulation sheet to reduce effectively interference between adjacent memory cells.

5 Claims, 12 Drawing Figures

MATRIX MEMORY DEVICE OF HIGH BIT DENSITY

This application is a continuation in part of our copending U.S. Pat. application, Ser. No. 12,393 filed on Feb. 18,1970 and now abandoned.

This invention relates to matrix memory devices of high bit density using magnetic flux keepers.

Since magnetic flux keepers can improve the efficiency for drive currents in a matrix memory device and the effective to reduce interfering magnetic fields between adjacent memory cells in a matrix memory device so as to improve the bit density of the matrix memory device, these magnetic flux keepers have been frequently employed in matrix memory devices. However, it is very difficult to realize a miniaturezed magnetic flux keeper used in a matrix memory device of high bit density in accordance with technique of conventional magnetic flux keepers. Accordingly, sufficiently miniaturized matrix memory devices of high bit density cannot be realized in accordance with the conventional art.

An object of this invention is to provide matrix memory devices of high bit density using readily miniaturizable magnetic flux keepers.

In a matrix memory device of high bit density according to this invention, a magnetic flux keeper is provided to attain the above object and other object of this invention, so that a number of ribbon-shaped conductors each having a height more than twice a width thereof and coated with a ferromagnetic thin film except an edge line thereof are arranged in parallel equally spaced in a first insulation sheet. In this case, each of two faces of each of the ribbon-shaped conductors each coated with a ferromagnetic thin film is opposed, through insulation material of the insulation sheet, to one face of adjacent one of the ribbon-shaped conductors. Moreover, the abovementioned edge lines without the ferromagnetic thin film of the ribbon-shaped conductors appear on the surface of the insulation sheet. Accordingly, the ferromagnetic thin film does not form a closed magnetic circuit around the ribbon-shaped conductor. To make the matrix memory device of this invention, another second insulation sheet, on which a plurality of slender conductors each coated with a ferromagnetic thin film are arranged in parallel to one another equally spaced, is combined with the fore-said first insulation sheet so that the slender conductors each coated with the ferromagnetic thin film and arranged on the second insulation sheet intersect substantially at right angles with the ribbon-shaped conductors on the first insulation sheet.

The principle and construction of the matrix memory device of this invention will be better understood from the following more detailed discussion in conjunction with the accompanying drawings, in which the same or equivalent parts are designated by the same characters, numerals or symbols, and in which.

Figure 1:
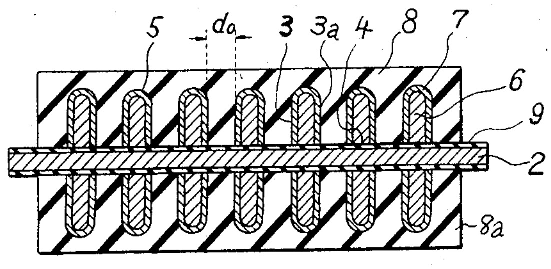
FIG. 1 is a sectional view illustrating an example of the matrix memory device of this invention.

With reference to FIG. 1, an example of the matrix memory device of this invention comprises a pair of insulation sheets 8 and 8*a* and a plurality of row magnetic lines 2 arranged in parallel to each other and held between the two insulation sheets 8 and 8*a*. In each of the insulation sheets 8 and 8*a*, a number of magnetic ribbon-lines 5 each of which is a ribbon line or ribbon conductor 6 coated with a ferromagnetic thin film 7 except an edge line 4 of the ribbon line 6 are arranged in parallel to one another equally spaced at equal intervals $d_o$. In this case, each of two faces 3 and 3*a* of each of the magnetic ribbon lines 5 in opposed, through insulation material of the insulation sheet 8 or 8*a*, to one face 3 or 3*a* of an adjacent one of the magnetic ribbon lines 5. Moreover, the edge lines 4 without the ferromagnetic thin film of the magnetic ribbon lines appear on the inside surface of the insulation sheet 8 or 8*a*.

Accordingly, the ferromagnetic thin film 7 does not form a closed magnetic circuit around the ribbon line 6. The above mentioned insulation sheets 8 and 8*a* hold therebetween a number of the magnetic lines 2 through insulation layers 9 so that the magnetic lines 2 intersect substantially right angles with the magnetic ribbon lines 5 on the insulation sheet 8 or 8*a*.

As understood from the above construction, the ferromagnetic thin films 7 and the ribbon lines 6 acting respectively as "magnetic flux keepers" and drive lines are incorporated in a single sheet (hereinafter called as "keeper sheet"). Since the ferromagnetic thin films 7 of magnetic flux keepers are magnetically isolated from one another, the space between adjacent magnetic ribbon-lines 5 can be extremely reduced in comparison with the conventional devices due to decrease of mutual interference.

In fabricating the keeper sheets (8 and 8*a*), a number of magnetic ribbon lines (5) each of which is a ribbon conductor (6) coated completely with a ferromagnetic thin film (7) are arranged in parallel with one another and fixed in a sheet of insulation material. Thereafter, one of the surfaces of the insulation sheet is abraded and polished as shown in FIG. 1 so as to eliminate the ferromagnetic thin films 7 deposited at each of the edge lines 4 of the ribbon lines 6. In accordance with this method of fabrication, spaces between adjacent magnetic ribbon lines can be correctly maintained even if the space is very narrow. Moreover, the construction of this keeper sheet is suitable for mass-production.

Figure 2:
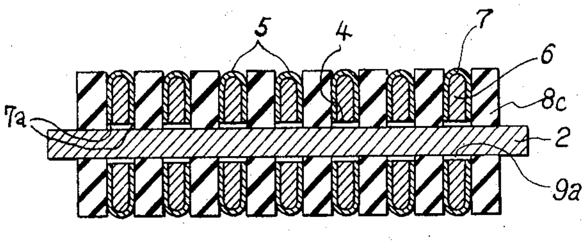
FIG. 2 is a sectional view illustrating another example of the matrix memory device of this invention.

FIG. 2 shows another example of the matrix memory device of this invention. The keeper sheet of this example is produced (i) by arranging alternately ribbon insulators 8*c* and the magnetic ribbon lines (5) each of which is a ribbon conductor (6) coated completely with a ferromagnetic thin film (7), (ii) by bonding mutually in accordance with heat treatment, and (iii) by eliminating the ferromagnetic thin films 7 deposited at each of the edge lines 4 of the ribbon lines 6 in accordance with etching or abrasion-and-polishing. If the etching is adopted, an air gap 9*a* is provided at each of the magnetic ribbon lines 5 since only the magnetic ribbon lines 5 of metallic material are etched while the ribbon insulators 8*c* are not at all etched. Accordingly, the insulation layers 9 employed in the example shown in FIG. 1 are not necessary in this example shown in FIG.2.

Figure 3:
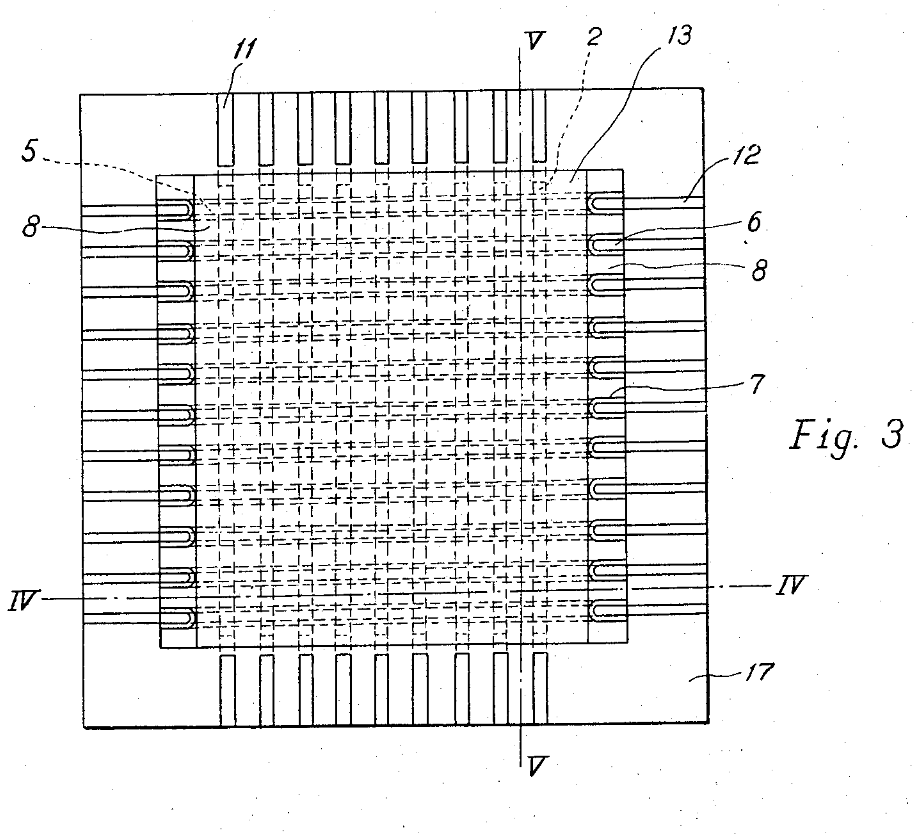
FIG. 3 is a plan view illustrating an example of the matrix memory device of this invention.

With reference to FIG. 3, another example of the matrix memory device of this invention will be described. In FIG. 3, digit line terminals 11 are provided at upper and lower edges of the device so as to be connected to the magnetic lines 2 respectively. Return lines 12 of word drive lines (6) are disposed in parallel equally spaced on an insulative substrata 17. A keeper sheet 13 has the similar construction as mentioned above with reference to FIGS. 1 and 2 and is bonded on the parallel magnetic lines 2 through an insulation layer 9. The internal conductors 6 of the magnetic ribbon lines 5 are employed as forward lines of the word-drive lines. The insulative substrata 17 is usually a board for printed-wiring. In this example, each of right and left and sides of the keeper sheet 13 has a slope on which the ribbon conductors 6 and the ferromagnetic thin films 7 of the magnetic ribbon lines 5 and the insulator 8 are exposed.

Figure 4:
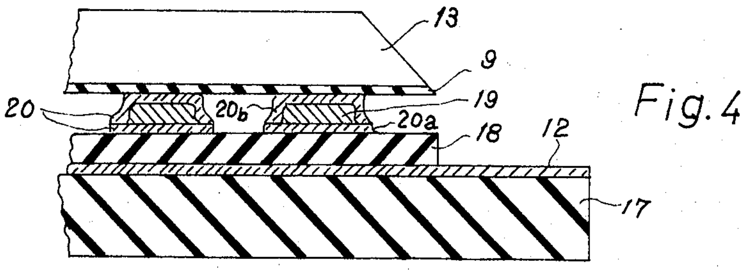
FIG. 4 is a fragmentary, sectional view along a line IV—IV in FIG. 3.

FIG. 4 shows a sectional view along a line IV—IV in FIG. 3. As understood from this FIG. 4, this matrix memory device comprises a number of magnetic lines 20 each of which is a slender conductor 19 completely coated with ferromagnetic thin films 20 and disposed on a glass plate 18, a number of return conductors 12 disposed in parallel to one another on the board 17, and the keeper sheet 13 bonded on the magnetic lines 2 through an insulative layer 9. In this case, the magnetic line 2 is produced (i) by depositing parallel ferromagnetic films 20*a* and slender conductors 19 on the glass plate 18 by the use of technique of evaporative deposition and photo-etching, and (ii) by electrically plating ferromagnetic thin films 20*b* on the slender conductors 19 so as to form a closed magnetic circuit around each of the slender conductor 19 by the two ferromagnetic thin films 20*a* and 20*b.*

Figure 5:
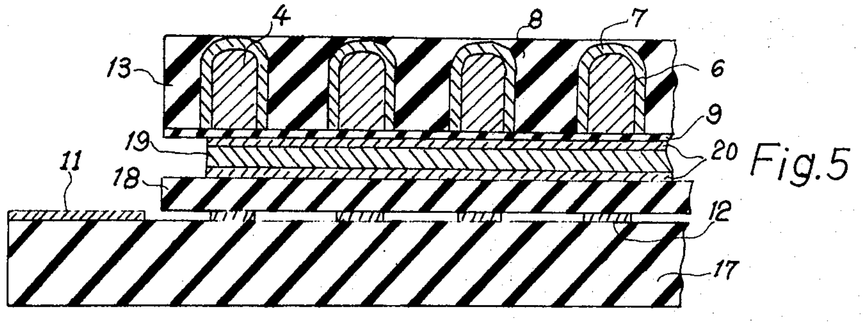
FIG. 5 is a fragmentary, sectional view along a line V—V in FIG. 3.

FIG. 5 shows a sectional view along a line V—V in FIG. 3. As shown in FIG. 5, the keeper sheet 13 comprises a number of ribbon conductors 6 each coated with a ferromagnetic thin film 7 except the edge line 4 of the ribbon conductor 6 and separated at regular spaces in an insulative material 8.

Figure 6:
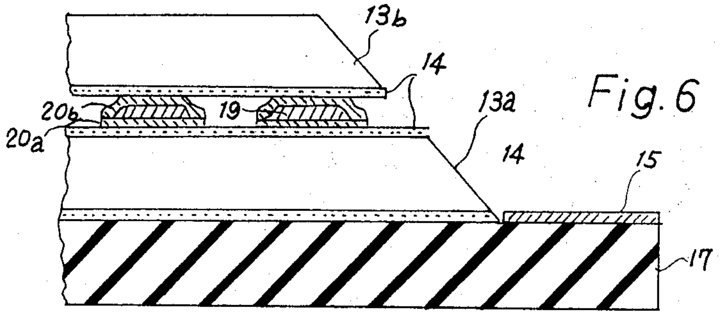
FIG. 6 is another fragmentary, sectional view along a line IV—IV in FIG. 3.
Figure 7:
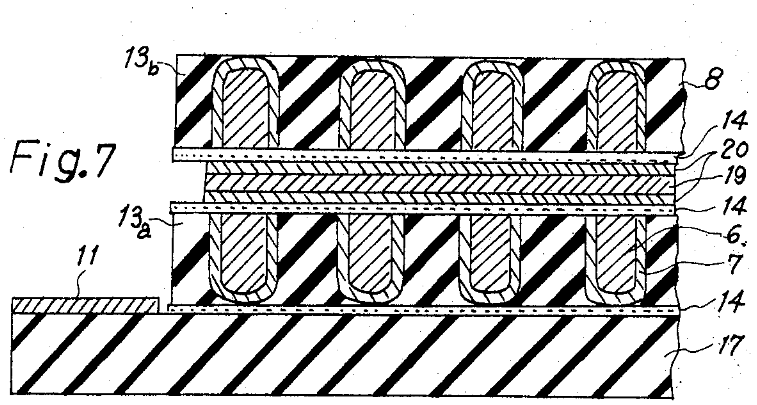
FIG. 7 is another fragmentary, sectional view along a line V—V in FIG. 3.

The return lines 12 may be formed as shown in FIGS. 6 and 7 similarly as shown in FIGS. 1 and 2. In this example, (i) a lower keeper sheet 13*a* is adhered by adhesives 14 on a board 17, (ii) a ferromagnetic thin film (20*a*) is adhered by adhesives 14 on the lower keeper sheet 13*a*, (iii) a conductive layer 19 (e.g. copper) is electrically plated on the ferromagnetic thin film (20*a*), (iv) the ferromagnetic thin film (20*a*) and the conductive layer (19) are photo-etched so as to produce parallel strips of the ferromagnetic thin film 20*a* and the slender conductor 19, (v) a ferromagnetic thin film 20*b* is electrically plated on each of the slender conductors 19 so as to form a closed magnetic circuit by the ferromagnetic thin films 20*a* and 20*b*, and (vi) the upper keeper sheet 13*b* is adhered by adhesives 14 on the parallel magnetic lines 5, each of which comprises the slender conductor 19 coated with the ferromagnetic thin films 20*a* and 20*b*. The ribbon conductors 6 of the keeper sheets 13*a* and 13*b* are connected to terminals 15 of word drive lines.

In all of above-mentioned examples of this invention, the ferromagnetic thin film 7 may be made by parmalloy or by applying ferrite powder on the ribbon conductor 6. Moreover, insulative magnetic substance such as ferrite may be further disposed at the ends 7*a* of opened two legs of the ferromagnetic thin film 7 in the example shown in FIG. 2.

As understood from the above-mentioned details, the matrix memory devices of this invention have the following merits:

1. Since the ferromagnetic thin film 7 forms a substantially closed magnetic circuit with respect to magnetic fluxes caused by a drive current flowing through the ribbon conductor 6, miniaturized construction of high-bit density can be readily realized and the magnetic strips 2 can be effectively driven by a small value of the drive current.
2. The matrix memory devices of this invention can be precisely and economically mass produced by the use of the techniques of evaporative deposition, photo-etching and electrical plating etc. This is also suitable to miniaturization and high-bit density.
3. Since the ferromagnetic thin films 20*a* and 20*b* are coated closely on the slender conductor 19, necessary digit currents are very small. Moreover, the signal-to-noise ratio of the output pulse obtained from the slender conductor 19 (circumference mode of the easy magnetization axis of the ferromagnetic thin films 20*a* and 20*b*) or from the ribbon conductor 6(axial mode of the easy magnetization axis of the ferromagnetic thin films 20*a* and 20*b*) is high. Accordingly, the operation of the matrix memory device of this invention is reliable, and the construction of the necessary periphery circuitry is simple.

Figure 8:
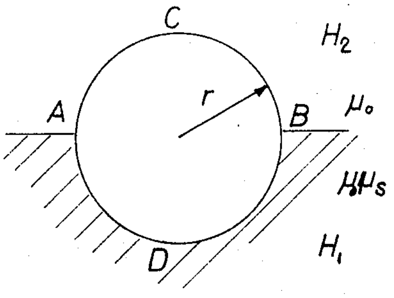
FIGS. 8 and 9 are a schematic section and characteristic curves explanatory of the characteristic of the sectional formation of each drive conductor used in this invention.
Figure 9:
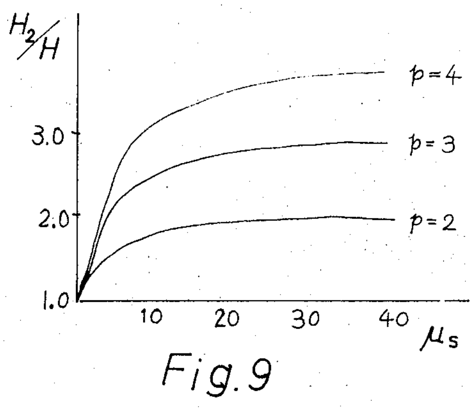

With reference to enclosed FIGS. 8 and 9, the intensity of a magnetic field on the surface of a conductor is described in a case where the conductor having a circular section of a radius $r$ is coated by magnetic material of the permeability $\mu_0\mu_s$.

In FIG. 8, if the length of an arc ACB is equal to one-pth the circumference, the length of an arc ADB is equal to (1-1/$p$)-times the circumference. If it is assumed that a current I is flowed in the conductor while magnetic fields $H_1$ and $H_2$ are caused at the inside and the outside of the conductor by the current I, the following relationship is obtained:

$$H_1\,(1-1/p)\,2\pi r + H_2 . 1/p . 2\pi r = I \ldots \quad (1)$$

$$\text{boundary condition:} \mu_0 H_2 = \mu_0 \mu_s H_1 \ldots \quad (2)$$

where "$\mu_o$" is the permeability of vacuum. From the equations (1) and (2), $$H_1 = (I/2\pi r) \cdot (p/\mu_s + p-1) \ldots \quad (3)$$

$$H_2 = (I/2\pi r) \cdot {}^{\iota}p/1 + (p-1)/\mu_s \cdots \quad (4)$$

The field intensity of the surface of the conductor is indicated by a value $H= I/2\pi r$.

Accordingly, from the equation (4), $$H_2 = H \cdot (p/1 + (p-1)/\mu_{s)} \cdots \quad (5)$$

If the permeability $\mu_s$ is sufficiently larger than a value $(p-1)$, the field intensity $H_2$ of the outside of the conductor is substantially $p$-times the field intensity H.

A relationship between the permeability$\mu_s$ and a ratio $H_2/H$ is shown by use of the value $p$ as a parameter in FIG. 9. From the characteristic curves, the ratio $H_2/H$ increases in accordance with increase of the parameter $p$ which corresponds to a ratio of the arc ADB to the circumference ADBC in FIG. 8.

Figure 10:
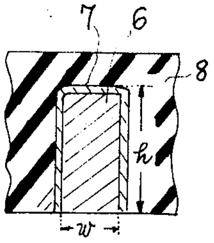
FIGS. 10 and 11 are sections each illustrating an example of ribbon-lines used in this invention.

The above mentioned analysis can be applied to the ribbon conductor used in this invention. If the ratio $1/p$ is equal to one-sixth by way of example, a ratio of a width $w$ to a hight $h$ shown in FIG. 10 is equal to one-half. In this case, if the permeability $\mu_o\mu_s$ of the ferromagnetic thin film 7 is approximately equal to one hundred, the ratio $H_2/H$ assumes six from the equation (5).

Figure 11:
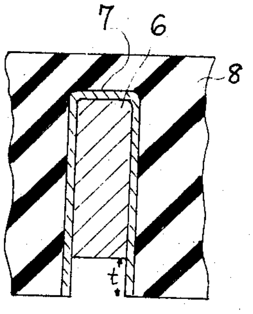
Figure 12:
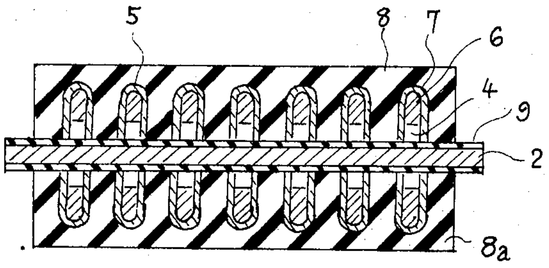
FIG. 12 is a section illustrating an example of this invention.

With reference to FIGS. 11 and 12, improvement on the S/N ratio of the output signal obtained from the memory device of this invention will be described. In the examples shown in FIGS. 11 and 12, an air gap 4 having a depth $t$ and a width $w$ is provided at a portion of the ribbon conductor 6 between magnetic lines 2 while the ferromagnetic thin film 7 is remained as it is. If an area of portions of the ribbon conductor 6 opposed to the magnetic lines 2 is a value $a$, the capacity C of the air gap 4 can be indicated by a value e.a/t: where "$e$" is the dielectric constant of the air. If the depth $t$, the capacity C and a noise voltage Vn are respectively assumed as $t_1$, $C_1$ and $Vn_1$ at a condition, the capacity C and the noise Vn become respectively values $\mathbf{100C_1}$ and $\mathbf{100V_1}$ in case of one-hundredth the depth $t_1$. Accordingly, it is desirable that the air gap 4 is deeper as far as possible in the view point of S/N improvement. However, since leakage flux through the air gap 4 increases according to unnecessary increase of the depth of the air gap 4, it is an appropriate condition where the depth $t$ is nearly equal to the width $w$. In this case, a S/N ratio of 30 can be obtained in our practical test.

What we claim is:

1. A matrix memory device of high bit density comprising: a set of parallel row magnetic lines arranged equally spaced, each row magnetic line comprising an electrically conductive line having a thin film magnetic coat circumferentially and axially thereof to form a closed magnetic circuit on each respective row magnetic line, two sets of electrically conductive parallel column lines arranged equally spaced on and insulated from opposite sides of the row magnetic lines intersecting orthogonally with the row magnetic lines defining memory cells at intersections between the row magnetic lines and the column conductive lines, said column conductive lines comprising ribbon conductors each having a hight more than twice a width thereof and each having a ferromagnetic thin film coat thereon extending circumferentially and axially thereon and a longitudinal edge free of said film coat disposed opposed to the row magnetic lines, the ribbon conductors having opposite side surfaces each spaced from and confronting opposite side surfaces of next adjacent ribbon conductors, the ribbon conductors being disposed paired on opposite sides of the row magnetic conductors with the edges free of said film coat of each pair of oppositely disposed ribbon conductors being disposed extending longitudinally parallel with each other and opposed to opposite sides of the row magnetic conductors, and means including two sheets of insulation bonding the ribbon conductors so that their edges free of said ferromagnetic film coat are opposed to the row magnetic lines and maintaining the row magnetic lines and ribbon conductors in fixed relative positions defining said memory cells.

2. A matrix memory according to claim 1, in which said longitudinal edges of said ribbon conductors are disposed in intimate contact with said row magnetic lines.

3. A matrix memory according to claim 1, in which said longitudinal edges of said ribbon conductors are disposed spaced from said row magnetic lines defining an air gap at intersections constituting said memory cells, the depth of the air gap substantially equal to the width of the ribbon conductors.

4. A matrix memory according to claim 1, in which said row magnetic lines each comprises a slender conductor having axially and circumferentially thereof two ferromagnetic thin films connected in series circumferentially of said slender conductor defining a closed magnetic circuit.

5. A matrix memory device of high bit density comprising: a set of parallel row magnetic lines arranged equally spaced, each row magnetic line comprising an electrically conductive line having a thin film magnetic coat circumferentially and axially thereof to form a closed magnetic circuit on each respective row magnetic line, at least one set of electrically conductive parallel column lines arranged equal spaced on and insulated from at least one side of the row magnetic lines intersecting orthogonally with the row magnetic lines defining memory cells at intersections between the row magnetic lines and the column conductive lines, said column conductive lines comprising ribbon conductors each having a hight more than twice a width thereof and each having a ferromagnetic thin film coat thereon extending circumferentially and axially thereon and a longitudinal side free of said film coat disposed opposed to the row magnetic lines, the ribbon conductors having opposite side surfaces each spaced from and confronting opposite side surfaces of next adjacent ribbon conductors, the ribbon conductors being disposed on at least one side of the row magnetic conductors with the sides free of said film coat of each ribbon conductor being disposed extending longitudinally parallel with each other and opposed to the row magnetic lines, and means including a sheet of insulation bonding the ribbon conductors so that their sides free of said ferromagnetic film coat are in opposed intimate contact with the row magnetic lines and maintaining the row magnetic lines and ribbon conductors in fixed relative positions defining said memory cells.

* * * * *